July 28, 1931.　　　　E. F. ELLZEY　　　　1,815,902

DEVICE FOR ADMINISTERING MEDICAMENTS

Filed July 16, 1927

Inventor
ESCO F. ELLZEY.
by William J. Karslake
Attorney

Patented July 28, 1931

1,815,902

UNITED STATES PATENT OFFICE

ESCO F. ELLZEY, OF BUFFALO, NEW YORK, ASSIGNOR TO NATIONAL ANILINE & CHEMICAL COMPANY, INC., OF NEW YORK, N. Y., A CORPORATION OF NEW YORK

DEVICE FOR ADMINISTERING MEDICAMENTS

Application filed July 16, 1927. Serial No. 206,182.

This invention relates to an improved composite pellet for the oral administration of such medicaments as are sensitive to the contents of the stomach, and more particularly, for the administration of tetraiodophenolphthalein in a form capable of assimilation by the walls of the duodenum.

The oral administration of tetraiodophenolphthalein, which substance is valuable in cholecystography, has been accompanied by many difficulties, because of its reaction with the acids of the stomach.

The sodium salt of tetraiodophenolphthalein is readily soluble in water but in the presence of mineral acids, such as hydrochloric acid, the free acid of the tetraiodophenolphthalein, which is very insoluble in water, is formed. If the sodium salt is administered orally, as for example in a plain gelatin capsule, the acid gastric juice of the stomach permeates the capsule and converts the salt into the insoluble free acid, a film of which forms around the periphery of the dye. This film retains the general contour of the capsule and is quite hard in consistency. Upon passing into the duodenum, these capsule shaped masses of the free acid are not all changed into the soluble salt by the alkaline intestinal juices, only a very small amount of the free acid being converted and available for absorption.

Figure 1:
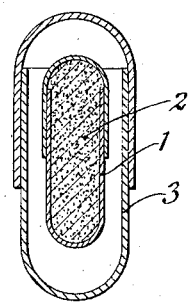
Figure 2:
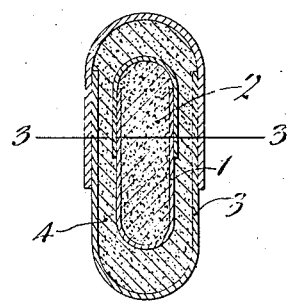
Figure 3:
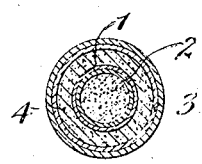

It has been found that the difficulties in administering such substances may be substantially eliminated by the use of a double walled shell or capsule as shown in the accompanying drawings, in which Fig. 1 is a cross-section of one form of the invention, Fig. 2 a cross section of another form of the invention, and Fig. 3 a horizontal section on the line 3—3 of Fig. 2.

In the drawings, wherein like reference figures designate corresponding parts, 1 is a capsule containing a medicament 2 and surrounded by a second capsule 3. In the stomach, capsule 3 may be dissolved but the inner capsule 1 will pass in to the intestines substantially unaltered.

If a physiologically harmless alkaline material is placed in the annular space between the inner capsule 1 and the outer capsule 3, as shown at 4, Figs. 2 and 3, still further protection is afforded the medicament contained in the inner capsule. The layer of alkaline material surrounding the inner or central core or capsule containing the medicament is adapted to maintain it in an unaltered condition by preventing or hindering the acid gastric juice of the stomach from disintegrating it, and in consequence the capsule passes on to the intestinal tract where it is dissolved by the alkaline intestinal fluids. As suitable alkaline material placed in the space between the inner and outer capsule may be mentioned, for example, the alkali metal carbonates such as sodium bicarbonate and other compounds such as sodium borate, magnesium oxide, etc.

The capsules may be made of gelatine or any other material which is physiologically harmless and dissolves or disintegrates in the digestive tract, such as starch, and any desirable shape or form of capsule may be used.

It is obvious that changes in size, proportion, material and minor points may be made without departing from the spirit and scope of the appended claims.

It will be obvious that any suitable intestinal medicaments may be employed in accordance with the invention in place of the specific material above referred to.

By way of further example, other organic intestinal medicaments which might be used, embodying my invention, are:

Alkali metal salts of benzoic acid.
Alkali metal salts of salicylic acid.
Cincophen.
Pancreatin.

Other materials or medicaments which might be used in accordance with my invention will be apparent to physicians and others skilled in the art without further illustration.

I claim:

1. An improved composite pellet for oral administration of organic medicaments for intestinal treatment which are alterable by the fluids of the stomach which comprises an inner shell of a material soluble in the intestinal fluid containing the intestinal organic medicament and an innocuous alkaline material surrounding the shell of sufficient thickness to protect the capsule during its passage through the stomach.

2. An improved composite pellet for oral administration of organic medicaments for intestinal treatment which are alterable by the fluids of the stomach which comprises a double shell capsule of a material soluble in the intestinal fluid, having the inner shell containing the intestinal organic medicament and an innocuous alkaline material soluble in the stomach fluids between the shells of sufficient thickness to protect the inner shell during its passage through the stomach.

3. An improved composite pellet for oral administration of intestinal organic medicaments which are alterable by the fluids of the stomach which comprises an inner shell soluble in the intestinal fluid containing a sodium compound of tetraiodophenolphthalein and a layer of sodium bicarbonate surrounding said shell of sufficient thickness to protect the inner shell during its passage through the stomach.

In testimony whereof I affix my signature.

ESCO F. ELLZEY.